United States Patent [19]
Konrat et al.

[11] 3,742,011
[45] June 26, 1973

[54] TRINITROPHENYL CHLOROFORMATE AND CARBONATE AND A PROCESS FOR PREPARING SAME

[75] Inventors: Jean-Paul Konrat, Vert-le-Petie; Louis Le Roux, Sorgues, both of France

[73] Assignee: ETAT Francais Delegation Ministerielle pour L'Armement, Paris, France

[22] Filed: Mar. 1, 1971

[21] Appl. No.: 119,937

[52] U.S. Cl. ............................................. 260/463
[51] Int. Cl. ............................................ C07c 79/30
[58] Field of Search ....................... 260/463, 73 CA

[56] References Cited
UNITED STATES PATENTS

| 3,234,262 | 2/1966 | Kurkjy et al. | 260/463 |
|---|---|---|---|
| 2,065,110 | 12/1936 | Bird | 260/622 X |

*Primary Examiner*—Lewis Gotts
*Assistant Examiner*—Diana G. Rivers
*Attorney*—Waters, Roditi, Schwartz & Nissen

[57] ABSTRACT

Picryl chloroformate and picryl carbonate and a process for the preparation of these compounds, wherein anhydrous silver picrate is contacted with phosgene in the presence of acetonitrile, at a temperature in the range of −25° to 50° C, preferably, about 0° C.

9 Claims, No Drawings

TRINITROPHENYL CHLOROFORMATE AND CARBONATE AND A PROCESS FOR PREPARING SAME

BACKGROUND OF THE INVENTION

1. Field of the Invention

The present invention relates to novel derivatives of trinitrophenol and a process for producing same.

2. Prior Art

The known processes for preparing aryl chloroformates comprise reacting phosgene with phenols in the presence of a tertiary amine or with the sodium salts of said phenols.

However, these processes are not applicable to trinitrophenol (picric acid). In fact, the reaction of phosgene with trinitrophenol or with picrates usually results in the production of picryl chloride.

SUMMARY OF THE INVENTION

Novel trinitrophenol derivatives of the formula:

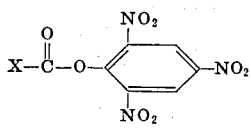

wherein X is a chlorine atom or a

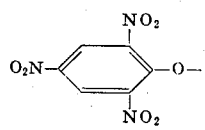

group are prepared by reacting phosgene with anhydrous silver picrate in the presence of a small amount of acetonitrile at a temperature of $-25°$ to $50°$ C., preferably around $0°$ C.

DETAILED DESCRIPTION

According to the present invention, there are provided novel derivatives of trinitrophenol, specifically, those corresponding to the following formula:

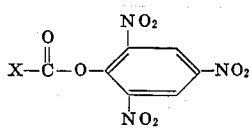

wherein X is a chlorine atom or a group of the formula:

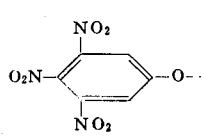

More specifically, the invention provides new industrial products which are picryl chloroformate having the formula:

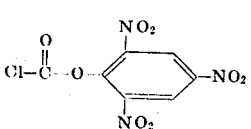

and picryl carbonate having the formula:

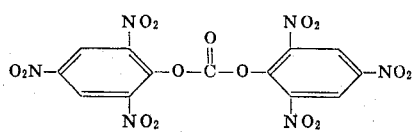

The proportion of $NO_2$ groups in these compounds is high (the nitrogen content of picryl chloroformate being 14.7 percent, and that of picryl carbonate being 17.3 percent); the oxygen content of these compounds has been found to be sufficient to oxidize all of the carbon to the CO state and all hydrogen to the $H_2O$ state in the process of decomposition. These products are stable and therefore can be used as explosives or as additives for solid propellants. By reaction with alcohols or amines, they can also act as intermediates in the manufacture of other products which are themselves explosives or additives for solid propellants.

According to the invention, there is also provided a process for preparing these new compounds.

We have now discovered that it is unexpectedly possible to prepare picryl chloroformate or picryl carbonate by reacting phosgene with anhydrous silver picrate in the presence of a small amount of acetonitrile at a temperature in the range of $-25°$ C to $50°$ C, although preferably the reaction temperature should be about $0°$ C.

The reaction can be conducted without solvent in suspension in liquid phosgene or it may be conducted in a compatible slightly polar and slightly ionizing solvent. Hydrocarbons or chlorinated hydrocarbons, such as methylene chloride, chloroform, benzene and toluene have given excellent results for this purpose.

The amount of acetonitrile used in usually between 10 and 50 percent of the weight of the silver picrate. If a smaller amount of acetonitrile is used, the reaction is slower; on the other hand, if a large amount of acetonitrile is used, or if acetonitrile is used as a solvent, the reaction takes place but the chloroformate which is found decomposes when an attempt is made to isolate it, because it is unstable in solution in polar solvents such as acetonitrile.

To prepare picryl chloroformate, the reaction is usually carried out in the presence of an excess of phosgene (more than 1.2 times the theoretical amount, namely more than 1.2 moles of phosgene pen mole of silver picrate), which is no problem since this phosgene can be easily recovered by distillation. On the other hand, if it is desired to prepare the carbonate, only an amount approaching the theoretical amount, namely one mole of phosgene to two moles of silver picrate, must be used.

The following examples are given by way of illustration,

EXAMPLE 1

Preparation of Picryl chloroformate by reaction of silver picrate in suspension in phosgene without solvent.

90 g of anhydrous silver picrate are placed into a roundbottomed flask, which is cooled to $0°$ C and 400 g of phosgene are condensed thereinto.

The resulting suspension which is kept at $0°$ C. is agitated; no reaction is discernible.

Then, 30 cc of acetonitrile are poured into the suspension; the suspension will then be found to gradually change in appearance and the reaction starts with the formation of a silver chloride precipitate. This reaction is practically terminated after two hours.

The major portion of the phosgene is evaporated, and the flask is filled with 400 cc of methylene chloride, after which the silver chloride precipitate is filtered off.

The solvent is evaporated off under vacuum, while keeping the temperature at 0° C. Picryl chloroformate is obtained in a light yellow crystalline state in a yield of 89 percent. The melting point of the crystals is 77.3° C; the infrared spectrum includes the 1,795 cm$^{-1}$ and 1,085 cm$^{-1}$ bands which are characteristic of chloroformates. Elemental analysis of these crystals gives the following results: Cl = 11.9 percent; N = 14.8 percent; O = 44 percent; H = 1 percent; C=28.8 percent.

The picryl chloroformate thus obtained is extremely stable and can be stored indefinitely away from moisture; in solution in carbon tetrachloride it remains unchanged after 2 days of heating at 80° C.

EXAMPLE 2

Preparation of picryl chloroformate using methylene chloride as solvent.

90 g of anhydrous silver picrate and 400 cc of methylene chloride are placed into a roundbottom flask which is cooled to about 0° C. Then, 100 g of phosgene are condensed into the flask.

The suspension which is kept at 0° C. is agitated; no reaction is noted. Then 30 cc of acetonitrile are poured in.

The suspension gradually changes appearance and silver chloride precipitates.

After three hours, the reaction is completed.

The major portion of the excess phosgene is driven off and the silver chloride precipitate is filtered.

Finally, the methylene chloride is evaporated off under vacuum, keeping the temperature at about or below 0° C. Picryl chloroformate crystallizes out; the product obtained melts at 75° C. in an 85 percent yield (based on the silver picrate).

EXAMPLE 3

Preparation of Picryl carbonate by direct phosgenation of silver picrate.

90 g of anhydrous silver picrate and 400 cc of methylene chloride are placed into a roundbottomed flask which is cooled to about 0° C. Then, 30 g of phosgene are condensed thereinto. The mixture is kept at 0° C. and agitated. Then, 30 CC of acetonitrile are added, the mixture changes in appearance. The mixture is kept around 0° C. for two hours, then the temperature is raised gradually until ebullition of the methylene chloride occurs. The suspension is heated for two hours so that the condensed liquid flows back to complete the reaction.

After filtration of the precipitate and subsequent evaporation of the solvent, 50 g of white picryl carbonate are isolated. Melting point: 228° C.

The infrared spectrum shows bands around 1,805 cm$^{-1}$ and 1,205 cm$^{-1}$, characteristic of the nitrophenyl carbonates.

Analysis: C = 32.4 percent; H = 0.84 percent; N = 17.40 percent; O = 49.78 percent.

What is claimed is:

1. A trinitrophenol derivative of the formula:

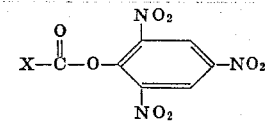

wherein X is a chlorine atom or a group of the formula:

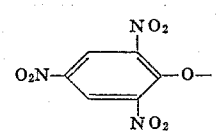

2. A trinitrophenol derivative as claimed in claim 1 which is picryl chloroformate.

3. A trinitrophenol derivative as claimed in claim 1 which is picryl carbonate.

4. A process for preparing trinitrophenol derivative of the formula:

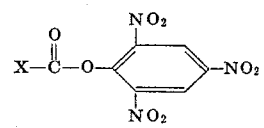

wherein X is a chlorine atom or a group of the formula:

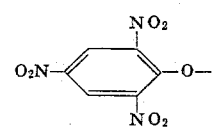

comprising reacting anhydrous silver picrate with phosgene in the presence of acetonitrile, at a temperature in the range −25° C. to +50° C.

5. A process as claimed in claim 4, wherein the temperature is about 0° C.

6. A process as claimed in claim 4, wherein the reaction is effected in the absence of solvent and in suspension in liquid phosgene.

7. A process as claimed in claim 4, wherein the reaction is effected in a slightly polar and slightly ionizing compatible solvent selected from the group consisting of hydrocarbons and chlorinated hydrocarbons.

8. A process as claimed in claim 7, wherein the solvent is methylene chloride, chloroform, benzene or toluene.

9. A process as claimed in claim 8, wherein the solvent is methylene chloride.

* * * * *

UNITED STATES PATENT OFFICE
CERTIFICATE OF CORRECTION

Patent No. 3,742,011  Dated June 26, 1973

Inventor(s) KONRAT, JEAN-PAUL, ET. AL.

It is certified that error appears in the above-identified patent and that said Letters Patent are hereby corrected as shown below:

On the cover sheet, insert -- [30] Foreign Application Priority Data    March 2, 1970    France    7007322 -- .

Signed and sealed this 25th day of December 1973.

(SEAL)
Attest:

EDWARD M. FLETCHER,JR.
Attesting Officer

RENE D. TEGTMEYER
Acting Commissioner of Patents